US007630776B2

(12) United States Patent
Harwood

(10) Patent No.: US 7,630,776 B2
(45) Date of Patent: Dec. 8, 2009

(54) METHOD AND SYSTEM OF CONTROLLING MEDIA DEVICES CONFIGURED TO OUTPUT SIGNALS TO SURROUNDING AREA

(75) Inventor: Ronald Paul Harwood, 31110 Applewood, Farmington Hills, MI (US) 48331

(73) Assignee: Ronald Paul Harwood, Farmington Hills, MI (US)

( * ) Notice: Subject to any disclaimer, the term of this patent is extended or adjusted under 35 U.S.C. 154(b) by 421 days.

(21) Appl. No.: 11/209,890

(22) Filed: Aug. 23, 2005

(65) Prior Publication Data

US 2007/0055389 A1 Mar. 8, 2007

(51) Int. Cl.

*G05B 11/01* (2006.01)
*H04B 7/15* (2006.01)
*H04B 7/185* (2006.01)
*H04B 7/14* (2006.01)
*H04W 24/00* (2009.01)
*F21S 13/02* (2006.01)

(52) U.S. Cl. ........................ 700/19; 362/457; 455/11.1; 455/13.1; 455/16; 455/423

(58) Field of Classification Search .................. 700/19; 455/11.1, 13.1, 16, 423; 362/457
See application file for complete search history.

(56) References Cited

U.S. PATENT DOCUMENTS

| | | | | |
|---|---|---|---|---|
| 4,716,344 | A | 12/1987 | Newell et al. | |
| 5,920,634 | A * | 7/1999 | Chiquette | 381/124 |
| 6,166,496 | A * | 12/2000 | Lys et al. | 315/316 |
| 6,188,933 | B1 | 2/2001 | Hewlett et al. | |
| 6,331,756 | B1 | 12/2001 | Belliveau | |
| 6,459,217 | B1 | 10/2002 | Belliveau | |
| 6,459,919 | B1 * | 10/2002 | Lys et al. | 600/407 |
| 6,480,578 | B1 | 11/2002 | Allport | |
| 6,605,907 | B2 | 8/2003 | Belliveau | |
| 6,622,053 | B1 | 9/2003 | Hewlett et al. | |
| 6,791,284 | B1 | 9/2004 | Levy | |
| 6,829,033 | B2 * | 12/2004 | Hose et al. | 352/40 |
| 6,859,644 | B2 | 2/2005 | Wang | |
| 7,167,103 | B2 | 1/2007 | Warren et al. | |
| 7,257,644 | B2 * | 8/2007 | Simonnet et al. | 709/238 |
| 7,363,209 | B2 * | 4/2008 | Kuschel et al. | 703/20 |
| 7,522,876 | B1 * | 4/2009 | Meitzen et al. | 455/7 |
| 2001/0047212 | A1 | 11/2001 | Hewlett et al. | |
| 2002/0047628 | A1 | 4/2002 | Morgan et al. | |
| 2002/0047648 | A1 | 4/2002 | Belliveau | |
| 2002/0048169 | A1 | 4/2002 | Dowling et al. | |
| 2002/0070688 | A1 | 6/2002 | Dowling et al. | |
| 2002/0078221 | A1 * | 6/2002 | Blackwell et al. | 709/231 |
| 2002/0093296 | A1 | 7/2002 | Belliveau | |
| 2002/0153851 | A1 | 10/2002 | Morgan et al. | |
| 2002/0163316 | A1 | 11/2002 | Lys et al. | |
| 2002/0171377 | A1 | 11/2002 | Mueller et al. | |
| 2002/0171378 | A1 | 11/2002 | Morgan et al. | |

(Continued)

*Primary Examiner*—Albert DeCady
*Assistant Examiner*—Thomas H Stevens
(74) *Attorney, Agent, or Firm*—Brooks Kushman P.C.

(57) ABSTRACT

A system of controlling media devices configured for outputting signals to a surrounding area. The system including a control strategy for controlling operation of the media devices to execute operations according to a common schedule and a communications strategy for use in communicating the control strategy between the media devices in such a manner as to facilitate distribution of the control strategy to the media devices desired to operate according to the common timeline.

6 Claims, 2 Drawing Sheets

U.S. PATENT DOCUMENTS

| | | | | |
|---|---|---|---|---|
| 2003/0001523 | A1 | 1/2003 | Belliveau | |
| 2003/0055689 | A1 * | 3/2003 | Block et al. | 705/5 |
| 2003/0137258 | A1 | 7/2003 | Piepgras et al. | |
| 2003/0151909 | A1 | 8/2003 | Sid | |
| 2003/0206411 | A9 | 11/2003 | Dowling et al. | |
| 2003/0208291 | A1 | 11/2003 | Belliveau | |
| 2003/0214259 | A9 | 11/2003 | Dowling et al. | |
| 2003/0222587 | A1 | 12/2003 | Dowling, Jr. et al. | |
| 2004/0017164 | A1 | 1/2004 | Belliveau | |
| 2004/0036006 | A1 | 2/2004 | Dowling | |
| 2004/0052076 | A1 | 3/2004 | Mueller et al. | |
| 2004/0141321 | A1 | 7/2004 | Dowling et al. | |
| 2004/0160198 | A1 | 8/2004 | Hewlett et al. | |
| 2004/0160199 | A1 | 8/2004 | Morgan et al. | |
| 2005/0029967 | A1 | 2/2005 | Chen et al. | |
| 2005/0035717 | A1 | 2/2005 | Adamson et al. | |
| 2005/0035730 | A1 | 2/2005 | Blum | |
| 2005/0047134 | A1 | 3/2005 | Mueller et al. | |
| 2005/0101314 | A1 * | 5/2005 | Levi | 455/423 |
| 2005/0116662 | A1 | 6/2005 | Sanchez | |
| 2005/0250440 | A1 * | 11/2005 | Zhou et al. | 455/12.1 |
| 2006/0092043 | A1 * | 5/2006 | Lagassey | 340/907 |
| 2007/0079012 | A1 * | 4/2007 | Walker | 709/249 |
| 2007/0096895 | A1 | 5/2007 | Sneade, Jr. | |
| 2007/0291483 | A1 * | 12/2007 | Lys | 362/227 |

* cited by examiner

METHOD AND SYSTEM OF CONTROLLING MEDIA DEVICES CONFIGURED TO OUTPUT SIGNALS TO SURROUNDING AREA

BACKGROUND OF THE INVENTION

1. Field of the Invention

The present invention relates to methods and systems of controlling media devices configured to output signals to a surrounding area.

2. Background Art

Media devices may be configured to output signals to a surrounding area. The surrounding area may be generally characterized as an ambient environment proximate the media devices from which an occupant may receive the outputted signals. For example, the media devices may be audio type devices configured to emit audio signals, a lighting type device configured to emit lighting signals, a video type device configured to emit lighting and video signals, and/or any other type of device having a suitable configuration.

One problem faced with such media devices relates to controlling the operation thereof. In particular, it may be difficult to coordinate action of multiple media devices to operate according to a common schedule or plan. It may also be difficult to program the operation of the media devices after the media devices are manufactured and deployed in a network.

SUMMARY OF THE INVENTION

One non-limiting aspect of the present invention relates to overcoming the above-identified deficiencies by providing a means for coordinating action of multiple media devices and/or by easing programming of media devices after deployment in a network One non-limiting aspect of the present invention relates to a system of controlling media devices configured for outputting signals to a surrounding area. The system may include a control strategy for controlling operation of the media devices, a communications strategy for coordinating communication between the media devices, and a source configured to distribute the control strategy and the communications strategy to at least one of the media devices. The communications strategy may be configured to specify communication of the control strategy from at least one of the media devices to another of the media devices.

One non-limiting aspect of the present invention relates to a system of controlling media devices configured for outputting signals to a surrounding area. The system may include a control strategy for controlling operation of the media devices to execute operations according to a common schedule and a communications strategy for use in communicating the control strategy between the media devices in such a manner as to facilitate distribution of the control strategy to the media devices desired to operate according to the common timeline.

One non-limiting aspect of the present invention relates to a method of controlling media devices. The method may include configuring the media devices to output signals to a surrounding area according to instructions included within a control strategy and electronically distributing the control strategy to the media devices through a network communication medium.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description and the accompany drawings in which:

DETAILED DESCRIPTION OF THE PREFERRED EMBODIMENT(S)

Figure 3:
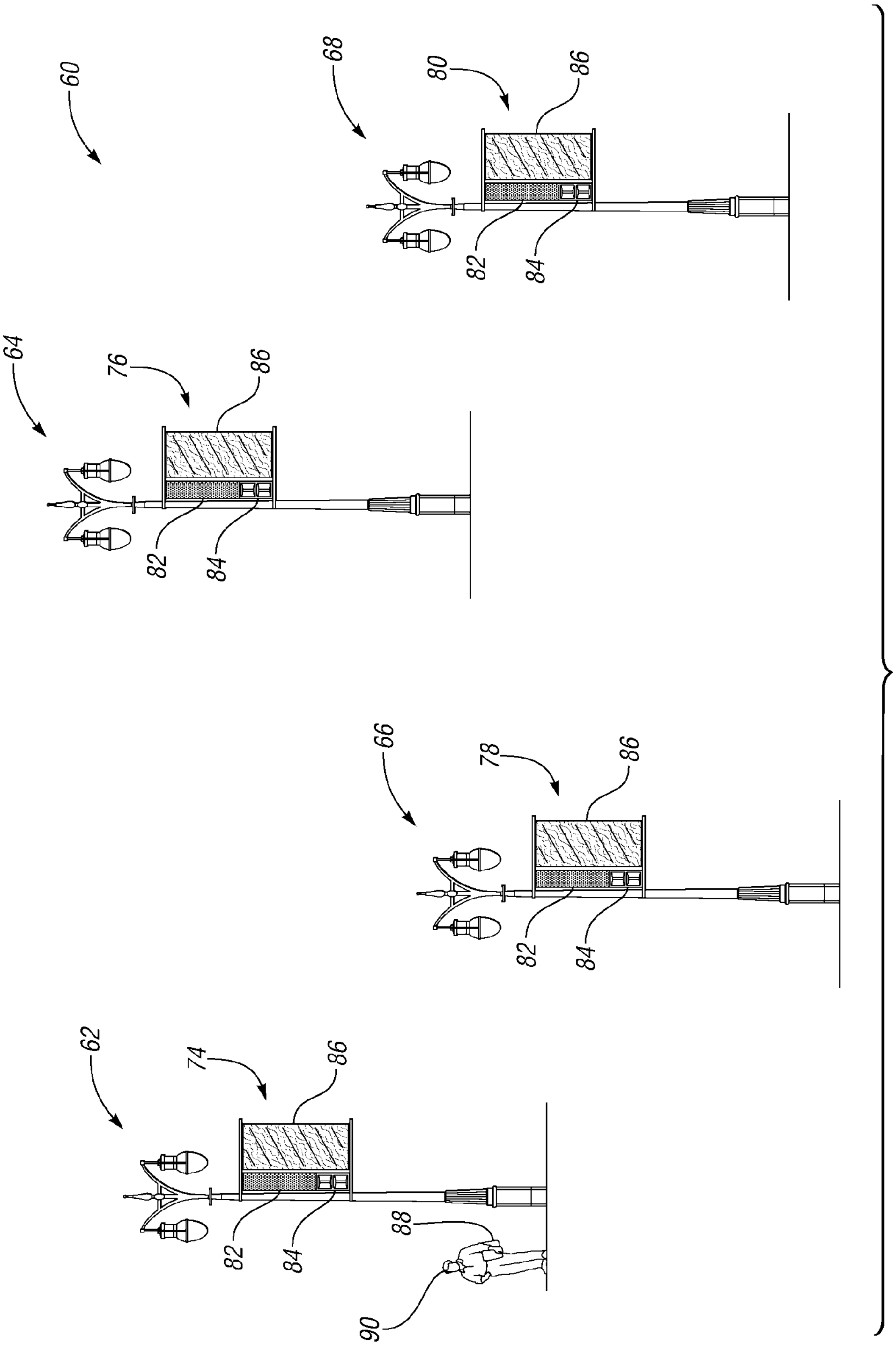
FIG. 3 illustrates a system for generating alerts at a number of geographically spaced apart light poles used to illuminate a thoroughfare, street, boardwalk, or other pedestrian area in accordance with one non-limiting aspect of the present invention.

FIG. 3 illustrates a system 60 for generating alerts at a number of geographically spaced apart light poles 62, 64, 66, 68 used to illuminate a thoroughfare, street, boardwalk, or other pedestrian area. An alerting device 74, 76, 78, 80 is affixed to each of the light poles 62, 64, 66, 68. The alerting devices 74, 76, 78, 80 may be configured to output a message to a surrounding area depending on conditions sensed by the alerting devices 74, 76, 78, 80 for the surrounding area. The message may be a visual message issued from a display 82, an audible message issue from a speaker 84, illumination or other attention draw to a banner 86, etc.

A controller 88, such as that carried on a person 90 or otherwise positioned in proximity to one or more of the light poles 62, 64, 66, 68 may be configured to communicate a control strategy to the alerting devices 74, 76, 78, 80. The control strategy may specify the messages to be outputted from the alerting devices 74, 76, 78, 80 as a function of sensed conditions. The control strategy may require a first one of the alerting devices (e.g., device 74) to output a first one of the messages and to instruct at least a second one of the alerting devices (e.g. device 76) to output the first one of the messages if the second altering device 76 fails to sense the conditions that prompted the first alerting device 74 to output the first one of the messages.

The controller 88 may be configured to wirelessly communicate the control strategy to a first portion of the alerting devices (e.g. devices 74, 76, 78) within a communication range of the controller 88. A portion of the devices 24, 26, 28 receiving the control strategy may then relay it to one or more devices (e.g. device 80) that are beyond the communication range of the controller 88, i.e., through wireline or wireless communications. In this manner, a second portion of the first portion of the alerting 74, 76, 78, devices within the communication range of the controller 88 may be required to communicate the control strategy to a third portion of the alerting devices 80 beyond the communication range of the controller 88.

Figure 1:
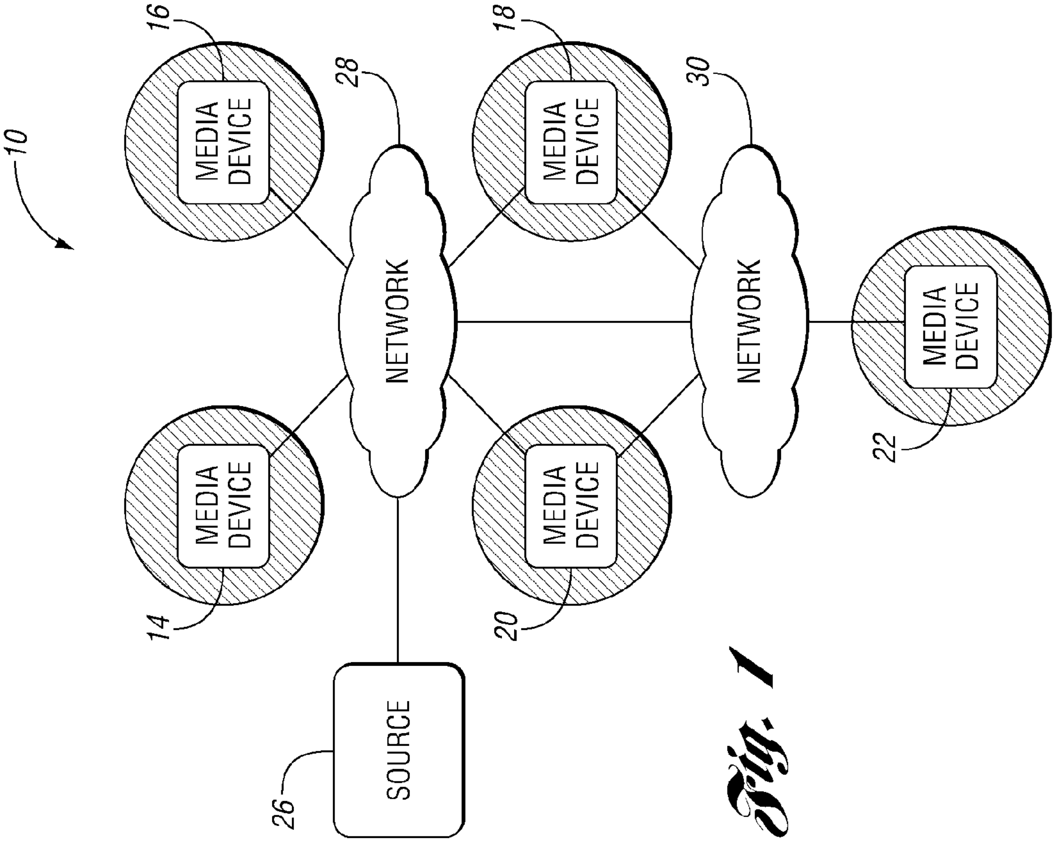
FIG. 1 illustrates a system in accordance with one non-limiting aspect of the present invention.

FIG. 1 illustrates a system 10 in accordance with one non-limiting aspect of the present invention. The system 10 may include a number of media devices 14-22 configured to emit signals to a surrounding area (shown with shading). A source 26 may be included for providing instructions and other signals to the media devices 14-22 over one or more networks 28-30.

The networks 28-30 may be wireline and/or wireless networks suitable for facilitating communications between the source 26 and media devices 14-22. The source 26 and media devices 14-22 may include features to facilitate communications with the networks 28-30. In particular, the source 26 and media devices 14-22 may include wireless features for facilitating wireless communications between each other. Optionally, more than one network 28-30 may be used to communication with some of the media devices 14-22, such as in a network mesh environment.

The media devices 14-22 may be generally characterized as any unit capable of emitting audio, visual, and/or audio-visual (video) signals to the surrounding areas. The media devices 14-22 may include memories, processors, communication interfaces, and other features to facilitate the operation thereof. The media devices 14-22 may be located in close proximity to each other and/or distributed over distant geographical areas.

One or more of the media devices 14-22 may be a lighting fixture. The lighting fixture may be configured to emit light and/or other visual signals to the surrounding area. The lighting fixtures may be controlled to perform any number of operations, including operations associated with theatrical lighting maneuvers. The lighting fixtures may be configured controlled according to any number of standards and protocols, including those specified in the DMX-512 protocol defined by the United States Institute for Theatre Technology, Inc. (USITT).

One or more of the media devices 14-22 may be an audio unit configured to emit audio signals to the surrounding area. The audio unit may include a memory or other feature for receiving and storing audio tracks. A playlist of other set of instructions may be provide to direct playback of the audio tracks to the surrounding area. Alternatively, the audio units may be configured to tune to particular buffered or real-time audio streams for broadcasting to the surrounding area. The audio unit may be a banner type speak unit, such as that specified in U.S. patent application Ser. No. 11/209,794, entitled Speaker Assembly For A Structural Pole And Method Of Mounting The Same, which is hereby incorporated in its entirety.

One or more of the media devices 14-22 may be a video unit configured to emit video signals to the surrounding area. The video unit may include a television screen or other display and an audio source to facilitate emitting audio-video signals to the surrounding area. The video unit may include a memory or other feature for storing video clips for subsequently playback to occupants in the surrounding area and/or otherwise configured for streaming video. Alternatively, the video units may be configured to tune to particular buffered or real-time video streams for broadcasting to the surrounding area. The video unit may be configured to receive video signals from a service provider or other entity.

The source 26 may be generally characterized as any unit capable of generating instructions for controlling operations of the media devices 14-22. The source 26 may include memories, processors, and other features for executing any number operations, including a communication feature to facilitate electronic communications with the media devices 14-22. The source 26 may be configured to receive and/or generate a control strategy for controlling operations of the media devices 14-22 and a communications strategy for controlling communications between the media devices 14-22 and source 26.

The source 26 may be a standalone feature having applications for use in controlling the media devices 14-22 and/or the source 26 itself may be a application, such as that run by a computer or other processing means, which may be executed by the computer for directly or indirectly controlling operation of the media devices 14-22. The source 26 may be a software program, logic, or other feature embodied in a computer readable medium or other suitable medium. The source 26, while shown as a feature separate from the media devices 14-22, may reside on one or more of the media devices 14-22 and need not be a separate feature.

The source 26 may be configured to receive or store a show schedule or other feature associated with formatting multiple operations of the media devices 14-22. The show schedule may include a timeline and corresponding operations to be executed at particular intervals or events. Queues, macros, and other features may be included within the show schedule to facilitate changing operations and other parameters associated with adjusting or otherwise varying operation of the media devices 14-22 to correspond with the show schedule.

The control strategy may be based on the show schedule or other set of events for controlling operations of one or more of the media devices 14-22. Multiple control strategies may be generated and distributed to the media devices 14-22 to control the operation thereof. In particular, if the system 10 includes different types of the media devices 14-22, multiple control strategies may be provided for each type of media device 14-22. Optionally, a common control strategy may be distributed to multiple media devices 14-22 to control the media devices 14-22 to cooperatively execute a number of operations according to a predefined schedule, such as to execute an audio, lighting, or video show where operations of multiple media devices 14-22 are coordinated according to a common schedule.

The communications strategy may be used to control communications between the media devices 14-22. The communications strategy may include features for coordinating delivery of the control strategy to other media devices 14-22. For example, the communications strategy may used to facilitate delivery of one or more control strategies to one or more media devices 14-22 so as to permit the media devices to be deployed in the system 10 without having the control strategy loaded prior to the deployment thereof and/or to facilitate distribution of changes to the control strategy without requiring the source 26 to directly communicate with each media device 14-22. The communications strategy may include instructions for transporting particular control strategies to media devices 14-22 associated therewith, such as to permit multiple control strategies to be transported to the same or different media devices 14-22.

The communications strategy may be used to control communications of newly added media devices with deployed media devices 14-22 and the source 26. The newly added media devices 14-22 may be configured to register or otherwise contact the deployed media devices 14-22 when attempting to enter the system 10. The deployed media devices 14-22 may consult the communication strategy and request information from the newly added media devices 14-22 to determine whether the newly added media devices 14-22 are to be added to the system 10. The other media devices 14-22 may authenticate or otherwise restrict access to the control strategy to media devices 14-22 meeting desired security parameters. The communications strategy may specify an authentication processes and other procedures for use in verify access to the control strategy. The approved media devices 14-22 may then be transferred the communications strategy to coordinate communications with other media devices in the system.

Once approved for addition to the system, the newly added media devices may retrieve one or more control strategies from the source 26 and/or other media devices 14-22 according to instruction included within the communications strategy. In this manner, the present invention is able to dynamically build an environment wherein media devices 14-22 may be freely added and controlled without requiring registration and authentication with the source 26 or other system administrators.

The source 26 may be configured to receive and/or generate a network integrity strategy. The network integrity strategy may be used to monitor the media devices 14-22 in the system 10 and to determine whether the monitored media devices 14-22 are operation according to the desired control strategy. The network integrity strategy may be configured to periodically poll the media devices 14-22 and to determine whether media devices 14-22 have been added or removed from the system 10.

Figure 2:
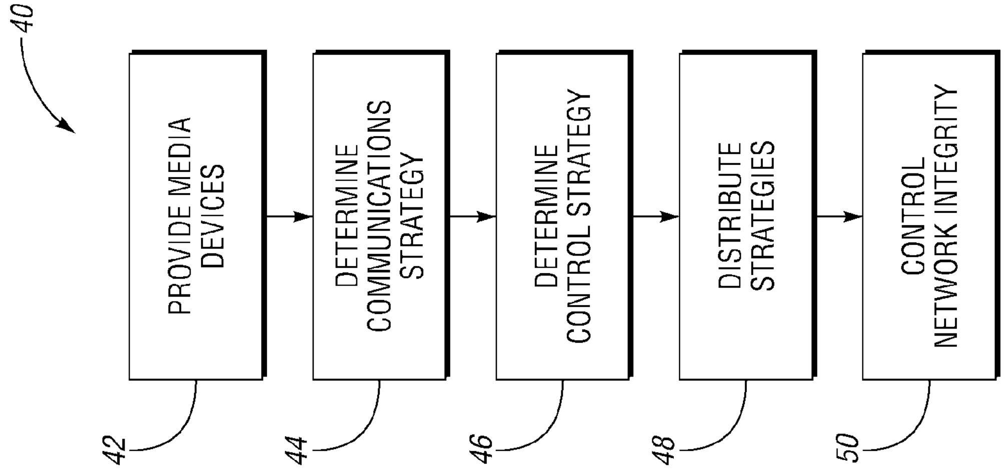
FIG. 2 illustrates a flowchart of a method for use in controlling the media devices in accordance with one non-limiting aspect of the present invention.

FIG. 2 illustrates a flowchart 40 of a method for use in controlling the media devices. The method associated with the flowchart 40 may be embodied in a computer readable medium, software application, or other logically functioning element to execute the operation described below. The method may be executed through operation of the source 26 and/or media devices 14-22 and require each such feature to be configured or otherwise suitably arranged to support the operations described below.

Block 44 relates to providing one or more of the media devices 14-22 into a desired arrangement. The media devices 14-22 may be arranged in a particular manner depending on the operations it may perform. For example, if one or more of the media devices 14-22 are lighting fixtures, the lighting fixtures may be arranged around a stage or otherwise grouped for providing lighting show. If the one or more of the media devices are banner speakers, the banner speakers may be arranged along a street, boardwalk, or other pedestrian area where it may be desirable to broadcast audio signals. If the media devices 14-22 are video units, the video units may be arranged in a viewing array or other arrangement to facilitate the viewing thereof. Any number or media devices 14-22 may be provided.

Block 44 relates to determining a communications strategy to define communications between the media devices 14-22 and the source 26. The communications strategy may define protocols and other features for controlling communications and insuring network integrity, as described below in more detail. The communications strategy may be distributed from the source 26 to one or more of the media devices 14-22 and/or directly from one or more of the media devices 14-22, such as if one of the media devices 14-22 is pre-loaded with the communications strategy.

Block 46 relates to determining one or more control strategies to control operations of the media devices 14-22. The control strategy may include any number or parameters, rules, and features for each particular media device. Multiple control strategies may be provided for any number of media devices 14-22. The control strategy may be used to coordinate activities of the media devices 14-22 according to a common schedule or plan.

For example, if the media devices 14-22 are lighting fixtures, the control strategy may specify execution of particular operations at particular intervals so as to provide a lighting show. If the media devices 14-22 are banner speakers, the control strategy may specify playback of particular audio tracks are predefined intervals so as to provide audio messaging capabilities and/or the control strategy may control the banner speakers to tune to particular buffered or real-time audio streams for broadcasting. If the media devices 14-22 are video units, the control strategy may specify playback of stored video and/or tuning to buffered or real-time video streams for playback.

Block 48 relates to distributing the control and communications strategies to each media devices 14-22 in the system. The strategies may be distributed from the source 26 to one or more of the media devices 14-22 through an hopped, ad hoc, point-to-point, point-to-many, peer-to-peer, or other delivery process. In addition to or in place thereof, one or more of the media devices 14-22 may be configured to distribute the strategies directly to the other media devices 14-22, and thereby, eliminate the need to include the source 26 in the system.

One aspect of the present invention relates to the ability of the system 10 to dynamically support adding media devices 14-22 to the system 10. As such, distributing the strategies to the media devices 14-22 may include distributing the strategies to media devices 14-22 attempting to become part of the system 10. The media devices 14-22 attempting to become part of the system 10 may include basic or common communication features to facilitate communications with one or more of the media devices 14-22 and/or source 26.

The communications strategies already associated with the deployed media devices 14-22 may include features for controlling when the new media devices 14-22 should be added to the system. A registration strategy or other authentication process may be provided within the communication strategy to facilitate this determination. Information, identifying characteristics, and other data may be verified before permitting the new media device 14-22 to become part of the system 10. Once added, the control strategies appropriate to the new media device 14-22 may then be distributed thereto from one of the media devices 14-22 and/or source 26.

Block 50 relates to providing network integrity control strategy to facilitate verifying network integrity. The strategy may include instructions for ascertaining the number of media devices 14-22 operating in the system 10 and whether the operations thereof are being executed according to the parameters defined in the corresponding control and communication strategies. The source 26 and/or one or more of the media devices 14-22 may include the network integrity strategy and be configured to coordinate the operations associated therewith.

The present invention contemplates an intelligent multiplexed communication environment having distributed control, monitoring and reporting for use in audio, video and lighting systems. For example, a homeland security application may include playback units installed in light poles at regular intervals down a street. Once programmed and content delivered, the light pole may play the scripted content synchronized with other light poles. The only way a light pole could quit playing audio is if power fails. Battery backup and solar recharging systems could be installed at each light pole to support uninterrupted playback. Reliability may be further strengthened by the wireless connectivity of 900 feet, meaning that on average 5 directly adjacent light poles would have to fail before global scripting updates would be halted.

A mission critical digital signage application may offer stand-a-lone players updated by master scripts and content from a central FTP server. Playback logs are forwarded to the FTP server nightly so they may be utilized for billing purposes as verification that the content played. Optionally, distributed monitoring features, i.e., multiple controllers requesting status of the same player, may be included to monitor the players. The distribute monitoring features may be configured to send alerts immediately when players fail their diagnostics. With the ability to incorporate such monitoring features into the players, the present invention is able to utilize redundancy from the number of other players on the network and the player can be identified as beginning to fail or failed well in advance of it being noticed. Reliability is strengthened by not relying on one central monitoring system to perform the diagnostics.

A retail, architectural, themed and performance venue application may include lighting systems supported by a number of processors distributed to each lighting device. The processors may be use in conjunction with a software package that allows users the ability create custom light shows, and/or capture existing lighting shows from any DMX lighting console. The information may then uploaded to the hand size processors connected to the lighting devices. Lastly the software may also allow monitoring of the lighting device verifying that the data arrived at the fixture and the device is performing properly. Optionally, the same light show may be distributed to all the hand sized processors and then pushed along the network to other processors. Should any processor fail to perform properly all processors will recognize the failure. If a new processor is added to the network it will connect to the nearest processor, retrieve the light show script, and data on which it should be monitoring.

A global scheduling script application may include a global script created as an image on a central server and then automatically distributed across all controllers (i.e. audio, video or lighting) on the network. The global scripting software may reside on a central computer that recognizes the type of controllers coming online and automatically adds them to the scripting interface so they can be scheduled. Since all controllers monitor each other, only controllers verified as online will be forwarded the global script information. The distribution of the script will be performed in a mesh pattern so as not allow any one controller to interfere in the transfer process. Newly authenticated controllers, as brought online, may simply request the latest global script from the nearest controller and receive both the script and the content from the adjacent device.

Each playback device may be a stand-alone unit that does not require any support from any other device to perform its duties. Source content (audio—MP3 files, videos—MPEG2 files, and lighting (show files) may be all stored on the individual player type. A global script (that may or may not consist of scheduling for all types of player content) may be created on a primary software package and then automatically distributed to all players allowing synchronization across the differing content players.

In another application, rather than have devices monitor each other, manufacturers may incorporate a feature called "Watch Dog" that watches for communication through an on board processor. If communication stops the device automatically reboots. After the device comes back on line it will send an email notifying the network administrator or store manager that it rebooted. Optionally, each device may monitor each other and then share its log files (data base) with all other control devices on the network. In this way all controllers know exactly what the other is doing and what processes it should be checking. If a failure is recognized intelligence is incorporated in the software that recognizes that at least one networked controller reported the error therefore none of the others have to do it. This may be helpful to check if a device drops off the network.

In another application, during setup, and then at periodic intervals, a master log from all controllers may be forwarded to a central database. A routine may then be activated that takes the data (data based) and transfers it to all controllers on the system letting them know who they should had been receiving telemetry from and who they should be sending telemetry to. This action may be a double check to make sure every controller on the network is being recognized.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for generating alerts at a number of geographically spaced apart light poles used to illuminate a street, boardwalk, or other pedestrian area comprising:

a number of alerting devices affixed to a corresponding number of the light poles, the alerting devices being configured to output a message to a surrounding area depending on conditions sensed by the alerting devices for the surrounding area;

a controller configured to communicate a control strategy to the alerting devices, the control strategy specifying the messages to be outputted from the alerting devices as a function of sensed conditions;

wherein the control strategy requires a first one of the alerting devices outputting a first one of the messages to instruct at least a second one of the alerting devices to output the first one of the messages if the at least the second one of the altering devices fails to sense the conditions that prompted the first one of the alerting devices to output the first one of the messages; and wherein a source wirelessly communicates the control strategy to a first portion of the alerting devices within a communication range of the source and at least a second portion of the first portion of the alerting devices within the communication range of the source communicate the control strategy to a third portion of the alerting devices beyond the communication range of the source.

2. The system of claim 1 wherein the control strategy limits the first one of the alerting device to instruct only the at least the second one of the alerting devices that are within a geographical location likely to be affected by the sensed conditions that prompted the first one of the alerting devices to output the first one of the messages.

3. The system of claim 2 wherein the second and third portions of the alerting devices wirelessly communicate with each other without assistance from satellites or other antennae that are not part of the alerting devices.

4. The system of claim 3 wherein the alerting devices are powered by energy used to power the light poles.

5. The system of claim 4 wherein the alerting devices are also powered by a battery in the event the energy used to power the light poles is unavailable.

6. The system of claim 1 wherein the communication range of the source is 900 feet.

* * * * *

UNITED STATES PATENT AND TRADEMARK OFFICE

CERTIFICATE OF CORRECTION

PATENT NO. : 7,630,776 B2
APPLICATION NO. : 11/209890
DATED : December 8, 2009
INVENTOR(S) : Ronald Paul Harwood It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 835 days.

Signed and Sealed this

Twenty-first Day of December, 2010

David J. Kappos
*Director of the United States Patent and Trademark Office*